June 1, 1937.　　　E. C. DAMROW　　　2,082,570
CHEESE HOOP
Filed Nov. 28, 1934
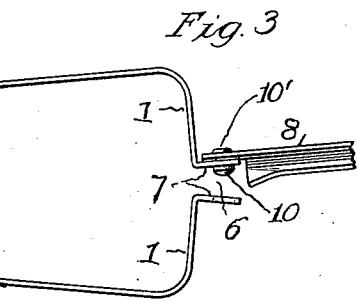
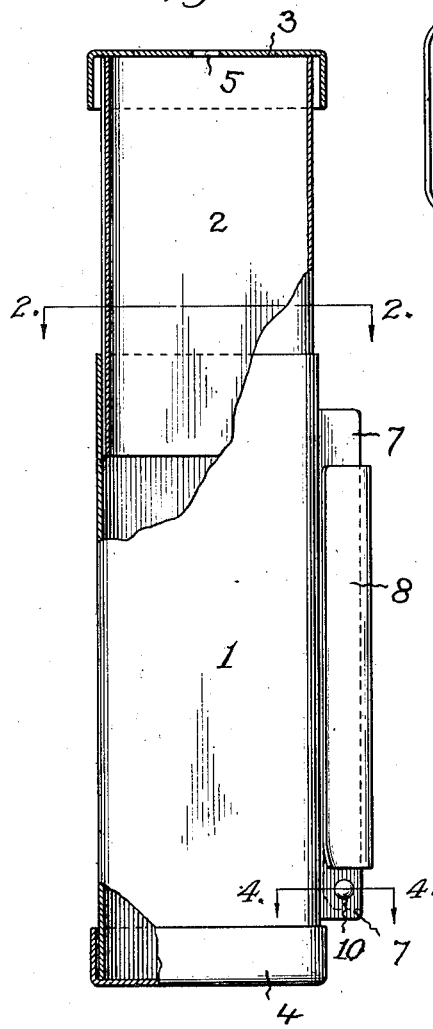
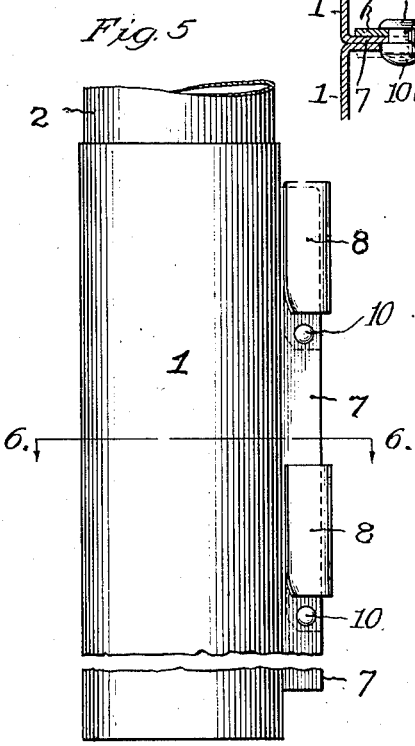
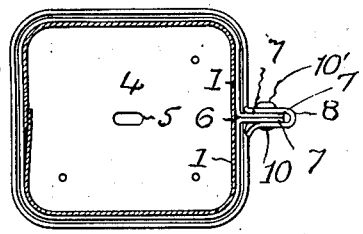
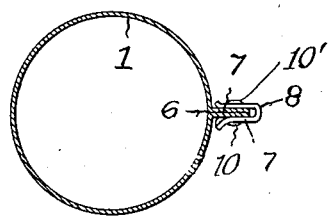
Inventor
Edward C. Damrow,
By Robert Burn,
Atty.

Patented June 1, 1937

2,082,570

UNITED STATES PATENT OFFICE 2,082,570

CHEESE HOOP

Edward C. Damrow, Fond du Lac, Wis., assignor to Damrow Brothers Company, Fond du Lac, Wis., a corporation of Wisconsin Application November 28, 1934, Serial No. 755,161

1 Claim. (Cl. 100—55.5)

This invention relates to the telescoping type of cheese hoops used in the production of an edible article of cheese, and more particularly in the production of that grade of cheese generally known to the trade as "Cheddar cheese". The hoop comprises an elongated main body or member, either round or rectangular in cross section, and has a uniform transverse area along its entire length. The hoop body is open at both ends and adapted to receive a filling and pressure sleeve formed for a sliding fit in the interior of the main hoop body, removable closure and pressure caps being provided for use in closing the open ends of said parts during the progress of forming the curd into a body of cheese. This improvement has for its object:

To provide a structural formation and combination of parts and features in a cheese hoop of the type above mentioned, adapted to produce, in an effective and convenient manner, a smooth and perfectly formed product, all as will hereinafter more fully appear.

In the accompanying drawing:

Fig. 1 is a side elevation partly in section of a rectangular cheese hoop, having this improvement applied.

Fig. 2 is a transverse section on line 2—2 of Fig. 1, showing the body of the hoop in a closed condition ready for actual use.

Fig. 3 is a companion view to Fig. 2, showing the parts in an open or expanded condition, without the sleeve.

Fig. 4 is an enlarged detail section on line 4—4 of Fig. 1, illustrating the means whereby the edges of the longitudinal slit in the main body of the hoop are brought and held in proper aligned relation.

Fig. 5 is a detail side elevation of a round cheese hoop having the invention applied, and showing a modified form of the means by which the out turned flanges at the slit of the hoop body are held in a closed condition.

Fig. 6 is a transverse section of the same on line 6—6 of Fig. 5.

Like reference numerals indicate like parts in the several views.

In the construction shown, the main body or portion 1 of the cheese hoop, either of the rectangular or circular shape in cross section, is of an elongated form and having a uniform transverse area throughout its entire length.

As so formed the hoop body 1 is adapted to receive in a sliding or telescoping manner a curd receiving and compressing sleeve 2, open at both ends and of a shape in cross section corresponding with that of the interior of the main hoop body 1.

Closure caps 3 and 4 are removably associated with the open ends of the hoop body 1 in different steps in the formation of a finished article of cheese, while the upper closure cap 3 is also adapted for use in closing the upper open end of the curd receiving sleeve 2, aforesaid, in the preliminary step of effecting a partial compression of the curd contents, as hereinafter more fully set forth in the operation of the cheese hoop.

The usual outlet orifices 5 are formed in the walls of the parts above described for the escape of the liquid or whey in the mass of contained curd.

In this improvement the hoop body 1 is formed with a longitudinal slit 6 extending the entire length thereof, with the edges of said slit out turned to provide outstanding flanges 7, 7, adapted to contact one with the other in a closed condition of the hoop body 1, and be held in said condition by one or more clasps, 8 of a U shape in cross section, pivotally mounted on one of said flanges.

A material feature of this improvement involves means whereby the edges of the longitudinal slit 6 are held in proper aligned relation with a view to avoid an objectionable offset in the interior of the hoop body 1 and a corresponding defect in a finished cheese product. To such end the stud or rivet 9 by which the clasp 8 is pivotally mounted on one of the longitudinal flanges 7 of the hoop body is of a special formation adapting it to accurately fit a receiving orifice in the opposed flange of the hoop body and insure perfect alignment of the edges of the pair of said flanges in the interior of the hoop body, such special formation of the parts being as follows:—

An enlarged head 10, of a cylindrical form, with its outer or free end of sphero-convex shape adapted to aid in guiding the head into operative engagement in its receiving orifice in the opposed flange 7 of the hoop body. At its inner end the head 10 terminates in a cylindrical extension of a smaller diameter, adapted to fit in a corresponding orifice in an adjacent flange 7 of the hoop body, the head abutting against the adjacent face of said flange.

The next adjacent part 9' of said extension is adapted to provide a pivotal bearing for the arm extension of the aforesaid clasp 8 by which the flanges 7, 7, are held in close contact, the remaining part of said cylindrical extension being of a length sufficient to provide metal enough for a swaging operation to provide a holding head 10' for maintaining the parts in proper operative relation.

With the construction above described, the formation and association of parts is adapted to provide a close and extended contact between the positioning stud member and the flanges of the hoop body to insure proper registry of the edges of said flanges in the interior of said body.

In the practical use of this cheese hoop in the production of canned Cheddar cheese, the hoop in its closed condition is placed upright in the vat and filled with curd. It is then covered with the upper closure cap 3, and kept in a fairly warm condition in order that the curd mass may settle down in the hoop. After this the hoops are submitted to pressure with both closure caps 3 and 4 in place. Under such pressure stress, the sleeve 2 closed at its upper end by the closure cap 3 moves or telescopes into the cavity of the hoop body 1.

The preliminary compression just described is usually exerted for a period of thirty to sixty minutes and should be sufficient to bring the contents of the hoop and bring the border flanges of the closure caps 3 and 4 to position encircling the portions of the material operated on which project beyond the ends of the hoop body 1.

The next succeeding step in the operation is to remove the closure caps 3, 4, turn back the clasps 8, open the hoop body 1 at its longitudinal slit 6, and slide out the pressed product, after which the product is wrapped in press cloth, soaked in warm water, with said press cloth preferably of the same length as that of said product. The wrapped product is then returned to the interior of the hoop body 1, the same closed and held closed by the clasp 8, and the closure caps 3 and 4 applied in a direct manner to the ends of the product, with a view to attain a smooth and finished appearance of the finished cheese product. The sleeve 2 is now dispensed with and final and continuous compression in a continuous compression cheese press is then applied to a plurality of the cheese hoops, usually for an overnight period. After the cheese product is taken out, the wrapper is removed, leaving the body of cheese ready to be cut and canned.

Having thus fully described my invention what I claim as new, is:—

In a cheese hoop of the type herein described, the combination of a main hoop body having a uniform transverse area along its length and provided with a slit which extends its entire length and out turned flanges at the edges of said slit, and means for fastening the flanges together in accurately alined relation, comprising a clasp of U form in cross section for engaging said flanges, and a positioning stud fixedly attached to one of said flanges, said stud comprising an enlarged head of a cylindrical form adapted to enter an aperture in one of said flanges and having an intermediate cylindrical pivot portion of a reduced diameter adapted to fit a receiving aperture therefor in the other of said flanges and an aperture in said clasp, the end opposite said head being swaged into an expanded head adapted to hold the parts in proper assembled relation.

EDWARD C. DAMROW.